May 14, 1940.  W. C. BAXTER  2,200,977
FOOD PRODUCT AND METHOD OF MAKING SAME
Filed Jan. 25, 1938

Frozen Cream

Wetted with Cream

INVENTOR
William C. Baxter
BY
ATTORNEY

Patented May 14, 1940

2,200,977

UNITED STATES PATENT OFFICE 2,200,977

FOOD PRODUCT AND METHOD OF MAKING SAME

William C. Baxter, Newtown, Conn.

Application January 25, 1938, Serial No. 186,780

7 Claims. (Cl. 99—137)

This invention relates to a food product and the method of making the same.

This invention is an improvement on the food product and the process for making the same disclosed in my prior Patent #2,065,550, patented December 29, 1936.

As in my prior patent, the food product of the present invention, comprises a mass of shredded cereal or other similar material preferably having a nutty or toasted flavor and normally having a crisp, crunchy texture, mixed or intermingled with cream and ice cream and providing a tasty food product.

My prior patent contemplates the making up of the food product at the place of consumption and at the time it is to be used. It is not feasible to make it up in large quantities ahead of time as the biscuit would absorb too much cream and become soggy. The present invention, however, provides an article and method of making it so that it can be manufactured beforehand and in substantial quantities at a central location and distributed in frozen condition to ultimate customers, either through dealers or directly.

Since the crisp crunchy condition of the mixed material is essential to a successful product, it is an object of the present invention to provide such a product with a minimum amount of absorption by the crisp crunchy material of the cream and ice cream used with the material to form the dish so as to prevent sogginess of the material.

According to the method of the present invention, cream is deposited in the container to form a pool which is frozen into a solid layer covering the bottom of the container. The biscuit of crunchy material is then rather quickly dipped into cream and placed on the layer of frozen cream and superposed by a lump of ice cream. The container is immediately placed in a freezing chamber to freeze into a solid mass.

This produces a food article in which the biscuit retains its crunchiness and crispness having a minimum contact with the liquid material so that it cannot absorb enough cream to become saturated with it.

When it is desired to use the food product, it is taken from the freezing chamber and the top of the container removed. The product thus exposed to atmospheric temperatures will melt to such a degree that they can be readily consumed.

As the ice cream and the layer of frozen cream melt just prior to and during consumption of the product, the cream and ice cream will be drawn into the biscuit so that the desired intermingling of the constituents of the food product results in a tasty dish.

If desired, syrup, sauce or fruit can be placed over the ice cream before or after freezing.

Other features and advantages of the invention will be apparent from the specification when taken in connection with the drawing, in which.

Figure 1:
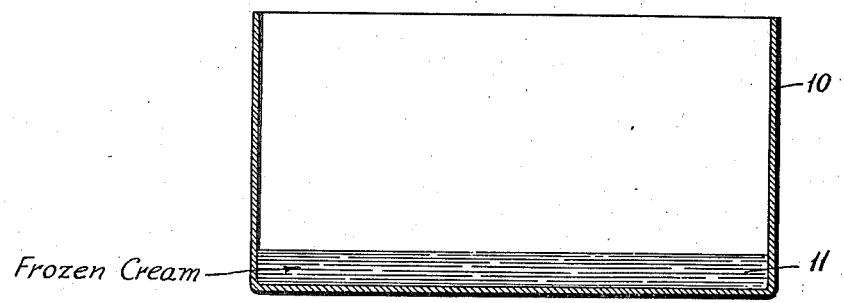
Figure 1 shows a section of the container with the frozen layer of the cream on the bottom.
Figure 2:
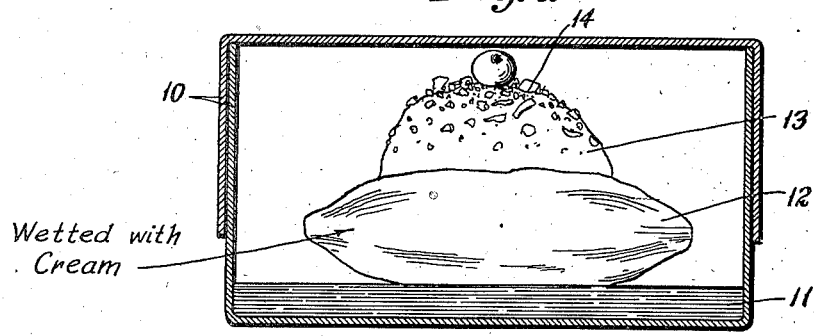
Fig. 2 shows a section of the container with the frozen cream biscuit and ice cream in position.
Figure 3:
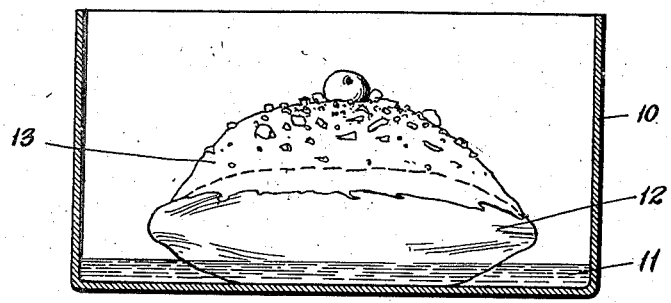
Fig. 3 shows a section of the container with the biscuit in condition to be consumed and the cream in the bottom of the container melted.

According to the present invention, a container 10 of any desired shape is provided. A pool of cream 11, preferably having the consistency of coffee cream, is formed in the bottom of the container. The container with the cream therein is put into a quick-freezing cabinet and left there until the cream in the bottom of the container has formed a layer of frozen cream covering the bottom surface of the container.

A biscuit or mass of crunchy crispy material, a cereal, or similar material, and preferably having a nutty or toasted flavor, is provided. This cereal may be, for example, the cereal that is sold under the name of "Shredded Wheat". The biscuit is dipped into cream which desirably is of the consistency of coffee cream, and quickly placed on the upper surface of the frozen layer of cream in the container, as shown at 12, before the frozen cream has had an opportunity to melt. A lump or portion of ice cream 13 is then quickly placed on the top of the cream-coated biscuit. The container is then placed in a quick-freezing room and left to freeze into a solid product.

If desired, the ice cream and biscuit can be covered with syrup of different flavors, sauces, nuts or fruits, as shown at 14, and is especially delectable with fresh fruit in season. These may be placed over the ice cream prior to closing the container and freezing the product or at the time the product is served.

The biscuit or mass of crisp crunchy material preferably used is of the type in which a plurality of interstices are provided which receive and hold, by capillary attraction, the cream when the biscuit is dipped therein. When this cream is quickly frozen, it is securely locked in place in and around the biscuit, but insufficient time is allowed to elapse before the freezing to permit the cream to be absorbed within the shreds or other several parts of the mass.

It will be seen that the biscuit, when placed on the layer of prefrozen cream, cannot absorb the cream in the container and hence the crispness of the biscuit is not destroyed.

The packaged products of the present invention may be shipped in frozen condition to dealers who sell them to ultimate consumers for use; or to the ultimate consumers directly. The consumer opens the container so that the food product is subjected to atmospheric temperatures. When this is done, the ice cream and the layer of frozen cream will melt and, due to the capillary action of the biscuit, will intermingle with the cereal biscuit so that, when spooned by the user, a fair portion of cream, ice cream and biscuit will be consumed with each bite. During the period of time that the food product is melting to the point where it can be conveniently consumed, the frozen cream thereof will be melting at the same time that the ice cream is melting so that the biscuit will not be subjected to the moist cream for so long a period so as to become soggy unless, of course, the consumer prefers to have it that way.

Variations and modifications may be made within the scope of this invention and portions of the improvements may be used without others.

I claim:

1. A frozen food product comprising a layer of frozen cream; a biscuit of strand-like crunchy cereal pieces having a frozen coating of cream thereon supported upon said layer of frozen cream; and a portion of ice cream on the cream-coated biscuit.

2. A product of the class described, comprising a container having a layer of frozen cream extending over the bottom thereof; a biscuit of strand-like crunchy material having a frozen coat of cream thereon positioned in the container and resting upon the layer of frozen cream; and a portion of ice cream on the cream-coated biscuit.

3. In a method of forming a frozen food product, the steps of forming a block of quick frozen cream; dipping a biscuit of strand-like crunchy material into cream having the consistency of coffee cream; placing the dipped biscuit upon the layer of frozen cream; supporting the wetted biscuit on the block of frozen cream; and quick freezing the wetted biscuit before the cream thereon renders the crunchy material soggy.

4. A method of forming a frozen food product which comprises forming a pool of cream having the consistency of coffee cream in a container; freezing the cream; dipping a biscuit of absorbent crunchy material having a plurality of interstices therein into cream having the consistency of coffee cream so that the cream penetrates the interstices; supporting the coated biscuit upon the layer of frozen cream; applying a portion of ice cream to the top of the biscuit; and freezing the completed product before the cream is absorbed by the biscuit.

5. As a new article of manufacture, a food product prepared for transportation and storage long prior to use comprising a block of quick-frozen cream and a porous mass of prepared absorbent food product containing in the pores and on the external surface a coating of cream, said mass with the cream carried thereby being quick-frozen solid before substantial absorption of the cream by the material of the mass, said frozen cream-carrying mass being supported by said block of frozen cream until exposed to non-freezing temperature in a suitable container immediately prior to use, whereupon the then thawed cream-wet mass of food product becomes partially submerged in a pool of then melted cream.

6. As a new article of manufacture, a food product prepared for transportation and storage long prior to use comprising a block of quick-frozen cream and a biscuit of absorbent strand-like crunchy cereal pieces having interstices therein containing in the interstices and on the external surface of the biscuit a coating of cream, said biscuit with the cream carried thereby being quick-frozen solid before substantial absorption of the cream by the crunchy material to render the same soggy, said frozen cream-carrying biscuit being supported by said block of frozen cream until exposed to nonfreezing temperature in a suitable container immediately prior to use, whereupon the then thawed cream-wet biscuit becomes partially submerged in a pool of then melted cream.

7. As a new article of manufacture, a food product prepared for transportation and storage long prior to use comprising a block of quick-frozen cream, a porous mass of absorbent food product containing in the pores and on the external surface of the mass a coating of cream and a mass of ice cream surmounting said mass of food product, said mass with the cream carried thereby and the ice cream surmounting the mass being quick-frozen solid before substantial absorption of the cream or of the ice cream by the material of said mass, said frozen cream-carrying mass and surmounting mass of ice cream being supported by said block of frozen cream until exposed to nonfreezing temperature in a suitable container immediately prior to use, whereupon the then thawed cream-wet mass of food product becomes partially submerged in a pool of then melted cream and the ice cream becomes soft and melts, intermingling with the mass of prepared absorbent food product.

WILLIAM C. BAXTER.